(12) United States Patent
Motto

(10) Patent No.: US 9,713,184 B2
(45) Date of Patent: Jul. 18, 2017

(54) METHOD FOR PERFORMING AN INTERACTION FROM A COMMUNICATING DEVICE CONFIGURED TO ESTABLISH A WIRELESS COMMUNICATION CHANNEL AND CORRESPONDING TELECOMMUNICATION SYSTEM

(75) Inventor: Andrea Motto, Nole (IT)

(73) Assignee: ProxToMe, Inc., San Francisco, CA (US)

( * ) Notice: Subject to any disclaimer, the term of this patent is extended or adjusted under 35 U.S.C. 154(b) by 138 days.

(21) Appl. No.: 14/404,505

(22) PCT Filed: May 28, 2012

(86) PCT No.: PCT/IB2012/052660
§ 371 (c)(1),
(2), (4) Date: Jan. 26, 2015

(87) PCT Pub. No.: WO2013/179083
PCT Pub. Date: Dec. 5, 2013

(65) Prior Publication Data
US 2015/0147972 A1 May 28, 2015

(51) Int. Cl.
*H04W 8/00* (2009.01)
*H04W 76/02* (2009.01)
(Continued)

(52) U.S. Cl.
CPC .... *H04W 76/023* (2013.01); *G06F 17/30876* (2013.01); *H04L 63/105* (2013.01);
(Continued)

(58) Field of Classification Search
CPC .................................................. H04W 76/023
See application file for complete search history.

(56) References Cited

U.S. PATENT DOCUMENTS

| | | |
|---|---|---|
| 2003/0153300 A1 | 8/2003 | Nakao |
| 2007/0030824 A1* | 2/2007 | Ribaudo ............... G01S 5/0018 370/328 |
| 2007/0211673 A1 | 9/2007 | Anantha |

FOREIGN PATENT DOCUMENTS

| | | |
|---|---|---|
| EP | 2 015 607 | 1/2009 |
| JP | 2003-235076 A | 8/2003 |
| JP | 2006-222619 A | 8/2006 |

OTHER PUBLICATIONS

International Search Report for PCT/IB2012/052660, mailed Jun. 5, 2013.
(Continued)

*Primary Examiner* — Alejandro Rivero
*Assistant Examiner* — Angelica M Perez
(74) *Attorney, Agent, or Firm* — Nixon & Vanderhye P.C.

(57) ABSTRACT

A method envisions that a first device equipped with a wireless communication channel performs discovery operations and becomes discoverable on the wireless communication channel. The attributes of the devices detected during such operations are sent from the first device operating as a client, together with its unique system identification code, to a computer server that implements a detection service in proximity in a certified manner and is associated with a database comprising a list of attributes for devices registered with the service using such database. In addition, the server computer records, for example, in such database, the detections of such attributes of detected devices.

19 Claims, 7 Drawing Sheets

(51) Int. Cl.
*G06F 17/30* (2006.01)
*H04W 4/00* (2009.01)
*H04W 12/06* (2009.01)
*H04L 29/06* (2006.01)

(52) U.S. Cl.
CPC ............ *H04L 67/42* (2013.01); *H04W 4/008* (2013.01); *H04W 8/005* (2013.01); *H04W 12/06* (2013.01); *H04L 63/0492* (2013.01)

(56) References Cited

OTHER PUBLICATIONS

Written Opinion of the ISA for PCT/IB2012/052660, mailed Jun. 5, 2013.

\* cited by examiner

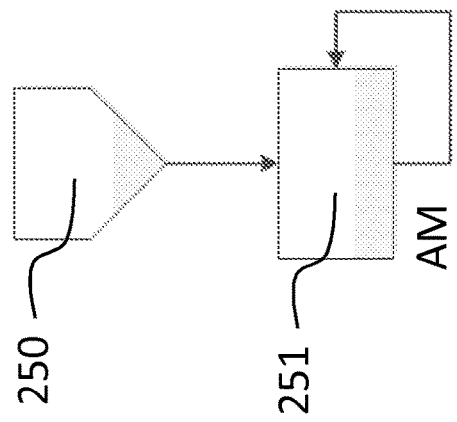
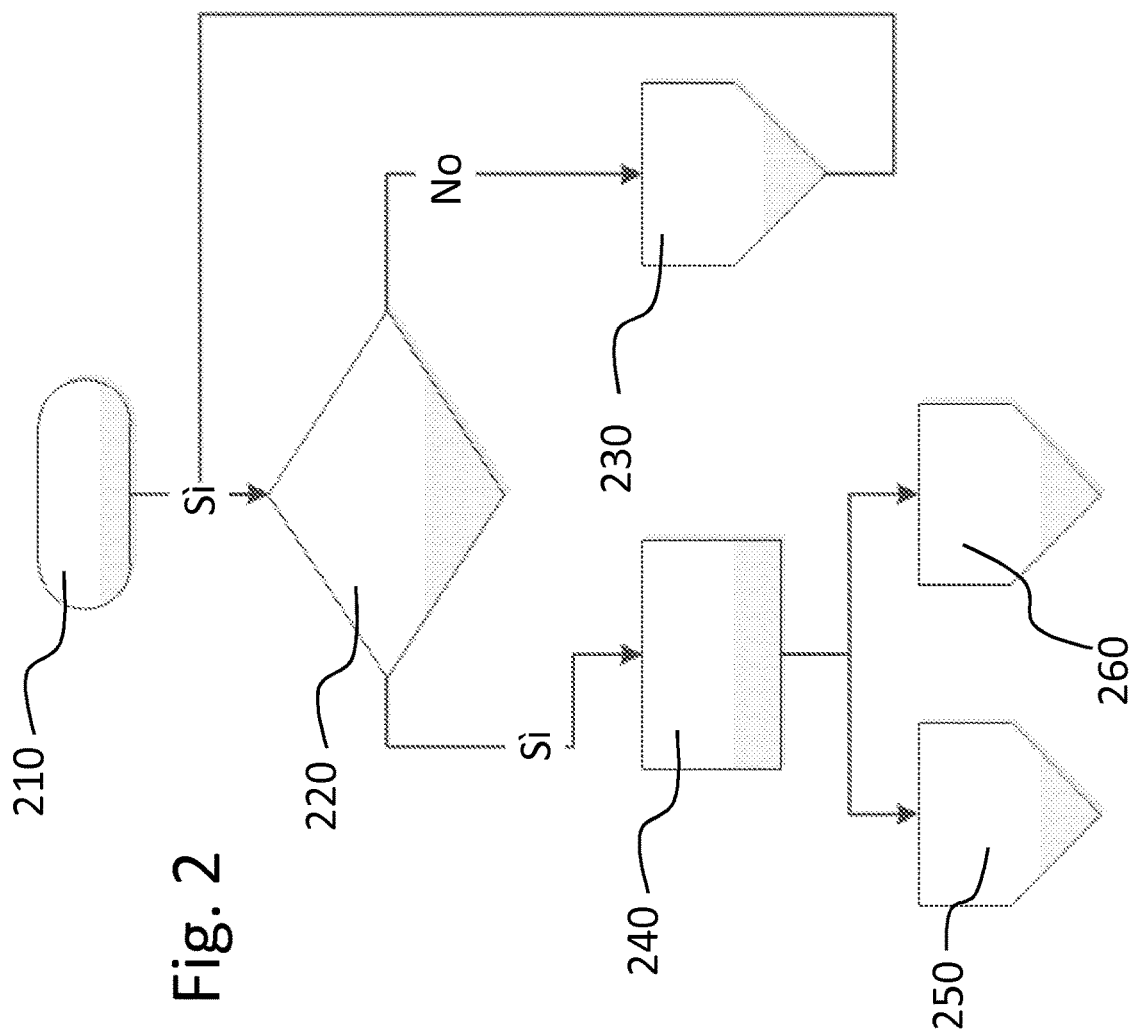
Fig. 3
Fig. 2

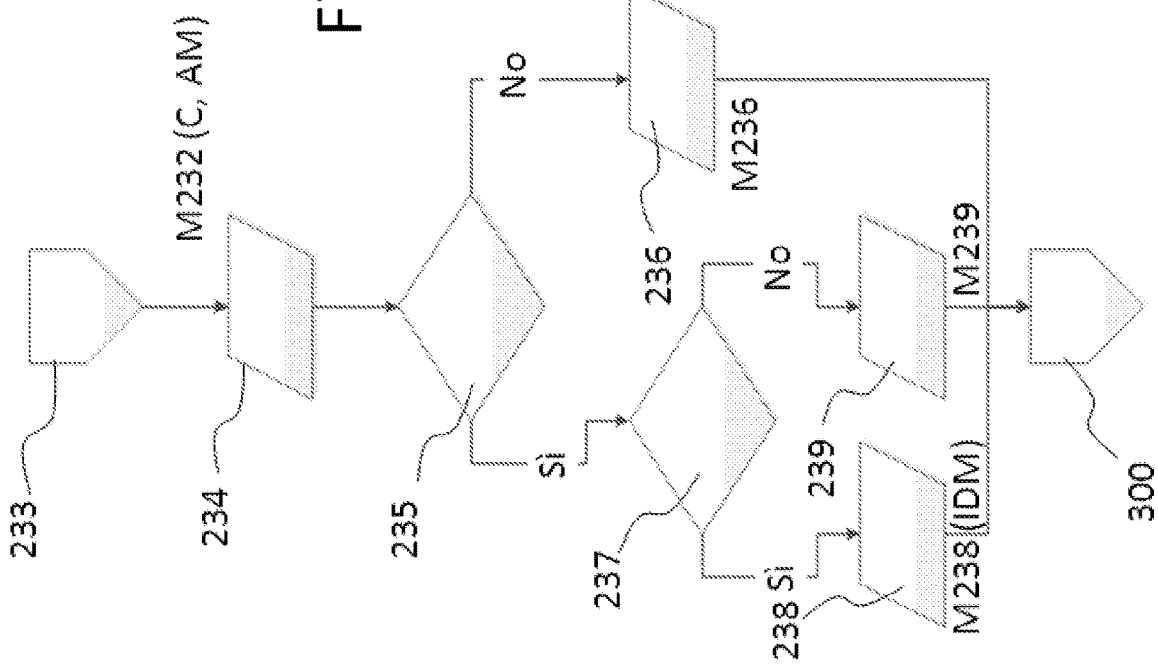

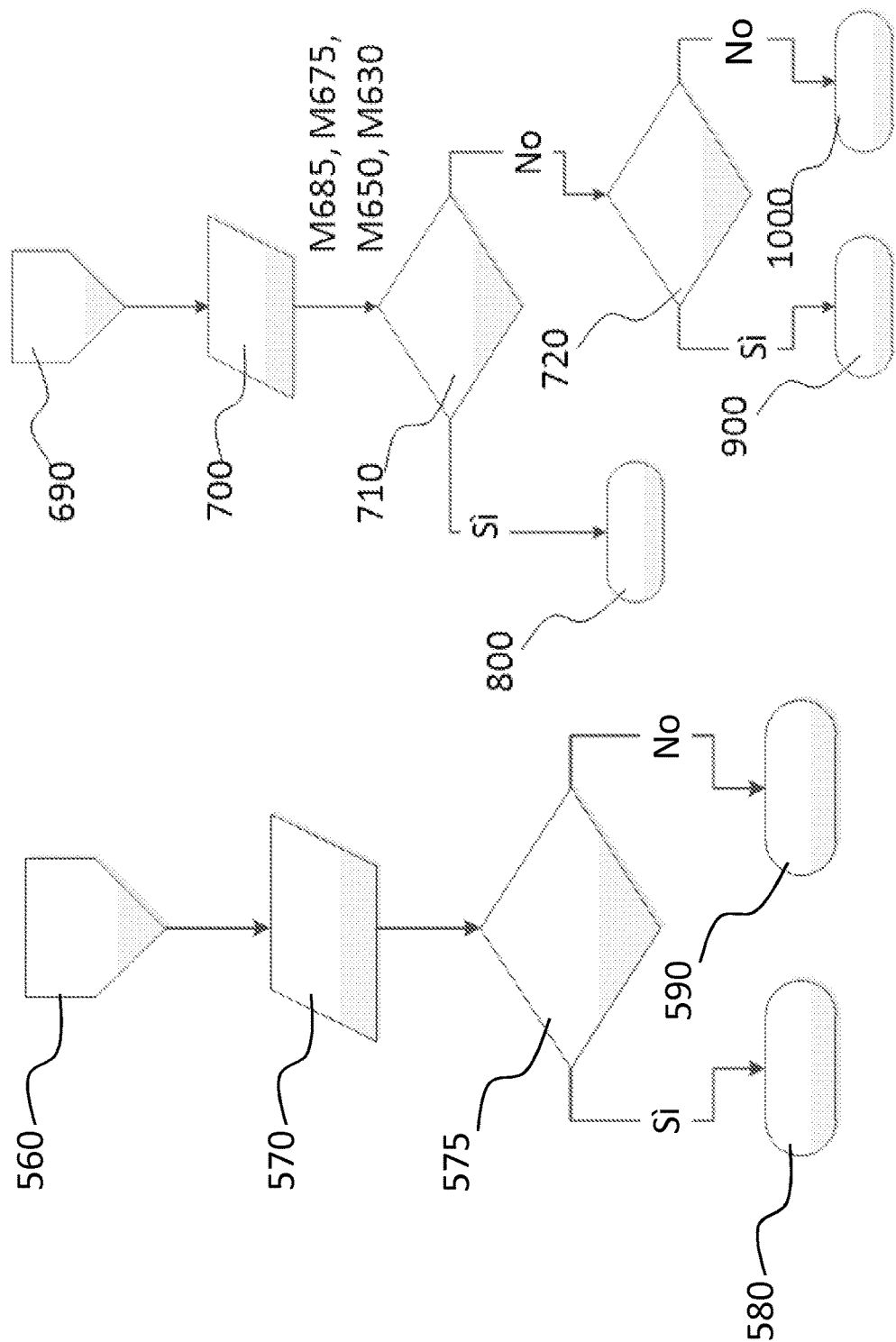

METHOD FOR PERFORMING AN INTERACTION FROM A COMMUNICATING DEVICE CONFIGURED TO ESTABLISH A WIRELESS COMMUNICATION CHANNEL AND CORRESPONDING TELECOMMUNICATION SYSTEM

This application is the U.S. national phase of International Application No. PCT/IB2012/052660 filed 28 May 2012 which designated the U.S., the entire content of which is hereby incorporated by reference.

DESCRIPTION OF THE TEXT

The present invention concerns a method for performing an interaction, in particular 'trusted', between a first communication device configured to establish a first wireless communication channel and one or more second devices configured to operate on
said first wireless communication channel, said wireless communication channel being suitable to allow the execution of discovery operations to search for devices that are visible, or discoverable, on said wireless communication channel within a radius of operation of said first wireless communication channel,
said method envisioning that said first communication device
publishes its device attributes on said wireless communication channel to become visible, and
detects through said wireless communication channel attributes published by said one or more second devices to become visible,
said first communication device accessing a database comprising stored attributes of the visible devices.

Communication devices adapted for establishing a wireless communication channel when in proximity are known, such proximity or proximity distance being defined by the radius of operation of such wireless channel, in particular the radius of operation useful for seeking nearby devices. Such devices may include complex devices, such as communication terminals, for example mobile telephones, or simpler devices, equipped with a single wireless communications channel to provide data to a device that interrogates them. Here we are referring specifically to communication devices capable of detecting on such wireless communications channel devices located in proximity through publication of the device attributes on such local communication channel and through the ability to read the attributes of the devices published on the communication channel. In other words, below it is made reference to communication devices that are capable of managing device discovery operations in which the device has at least the ability to become discoverable, i.e., searchable or visible to searching. Therefore, preferably this refers to devices that are equipped with peripherals or transceivers operating on and employing channels using the Bluetooth protocol, however what is described below is also applicable to other wireless communication protocols that implement discovery operations, for example Wi-Fi (Wireless Fidelity) protocols operating according to the IEEE802.11 standard.

Often such devices that use such types of wireless channels are of the 'untrusted' type, that is not reliable, because in the transactions described above their identity is not known with certainty. The terms 'trusted', reliable, or 'not trusted', are used to define devices incorporating or not security mechanisms against the introduction of malicious users and against cyber attacks such as data theft or spam.

Therefore, it may be disadvantageous to make a complete direct connection between devices of the 'untrusted' type, precisely because this would expose the devices to the risk of the above mentioned informatics attacks.

Such security problem is then amplified if in addition to correct identification of the device detected the service or application implemented by such devices requires that this be accompanied by a degree of certainty that the device with which it interacts is actually nearby, i.e., located within the radius of operation of the wireless channel, for example within the range of operation of a Bluetooth peripheral.

U.S. patent application US2005/0220221 discloses a method to identify a local device operating under the Bluetooth protocol, which envisions local storage of a database that associates a plurality of device identifiers to a plurality of Device_Names. A local device that receives the device identifier from a device in proximity will then search for the Device_Name in the database.

This overcomes the need to establish a full connection between the local device, herein referred to as master and the slave device, and avoids that the local master device, having obtained a list of devices in proximity, should perform a Name Discovery procedure for each of them.

However, such method has many disadvantages, among which the requirement to store on the device such database that associates a plurality of device identifiers to a plurality of names of 'friendly' devices. Furthermore, such method does not prevent malicious users from connecting during the identification process in an illegitimate manner (for example using the MITM, or man-in-the-middle procedure) with a device using such identifiers and Device_Names, which could be intercepted or in some cases derived from public information.

In this way a false identification of a device in proximity can also be made and false information can be obtained on the actual location in proximity of the device that is performing the discovery of a given detected device.

The present invention has the object of providing a method to allow a device equipped with a wireless communication channel with discovery capacity to interact with a device capable of operating on such communication channel in a correct and secure way, establishing in a certified manner the condition of proximity detection, before proceeding to access the information or services of the devices.

According to the present invention, such object is achieved by means of a method, as well as a corresponding telecommunications system having the characteristics specifically recalled in the claims that follow.

The invention will be described with reference to the annexed drawings, provided by way of non limiting example only, wherein:

FIG. 2 is a flow diagram illustrating an activation request of the method according to the invention;

FIG. 3 is a flow diagram relating to an activation phase of the method according to the invention;

FIG. 6 is a flow diagram relating to a server-side authentication phase of the method according to the invention;

FIG. 7 is a flow diagram relating to a client-side authentication phase of the method according to the invention;

FIG. 10 is a flow diagram relating to a client-side registration phase of the method according to the invention;

FIG. 12 is a flow diagram relating to a client-side decoding phase of the method according to the invention.

Figure 1:
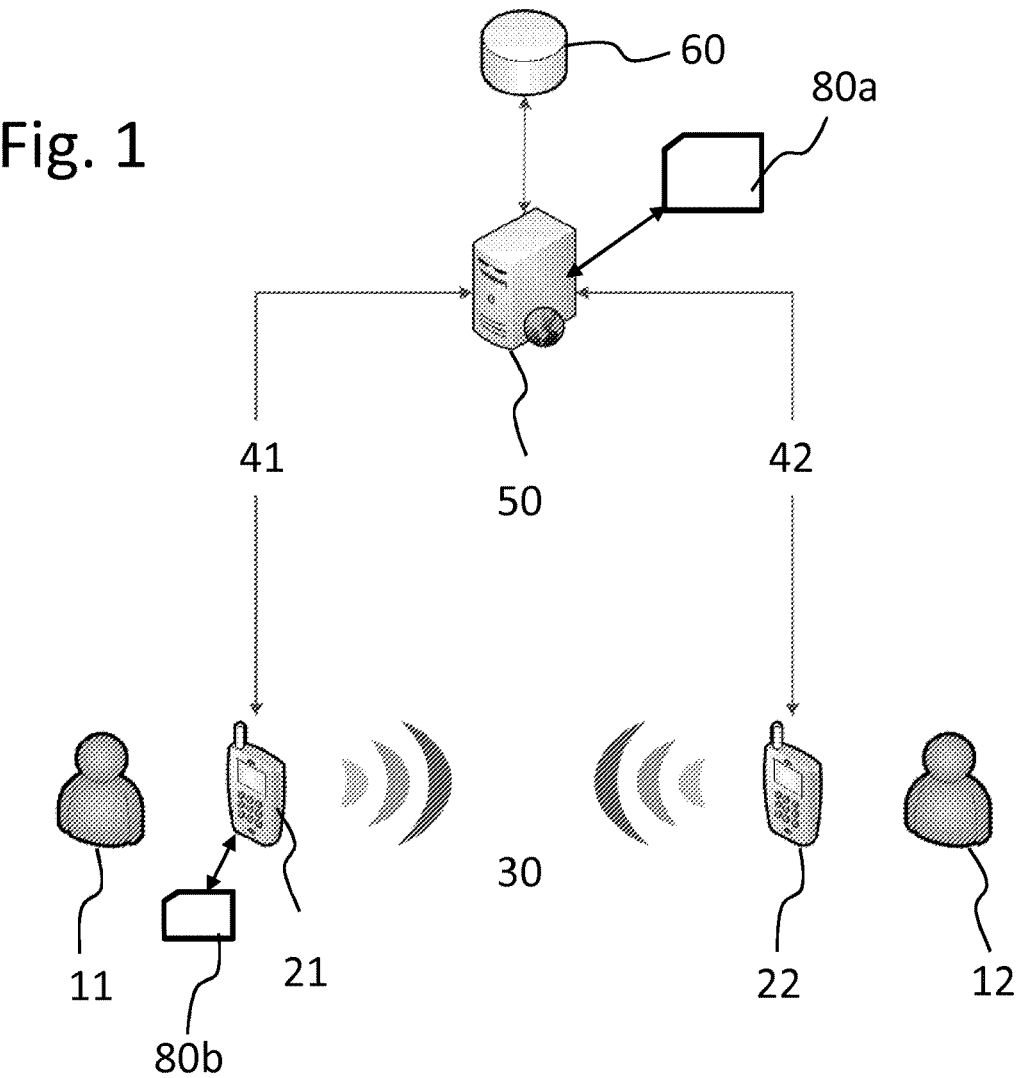
FIG. 1 is a general diagram of the system implementing the method according to the invention.

Briefly, the method envisions that a first device equipped with a wireless communication channel performs discovery operations and becomes discoverable on such wireless communication channel. The attributes of the devices detected during such operations are sent from the first device operating as a client, together with its unique system identification code, to a computer server that implements a detection service in proximity in a certified manner and is associated with a database comprising a list of attributes for devices registered with the service using such database. In addition, the server computer records, for example in such database, the detections of such attributes of detected devices.

In the database, in addition to verifying whether the first device or the detected devices are registered with the service, i.e., they are subscribers, if they are, the system identifier of the detected device is obtained. Furthermore, the server verifies if in addition to the detection of the second device, registered, by the first device, registered, that during a given time interval, the detection of the first device by the second device also occurred.

A message containing a system identifier of the second device and the results of those inspections performed at the server is then sent to the first client device, which such client device uses to determine in which mode to access the second device.

In any case, such access occurs by means of the communication channel between the first client device and the server, and, according to the mode of access, may comprise possibly employing also the communication channel between the second detected device and the server.

Advantageously, in this way, as a result of a discovery operation, the first device may obtain from a server, in particular of the 'trusted' type that implements a service requiring a registration or a subscription, a decoding message indicating that the detected device is registered and its system identifier, which distinguishes it in the service. This in itself constitutes a first inventive aspect of the invention, which allows definition of modes of access to information or services of the detected device using the indication of proximity and such system identifier of the detected device.

According to a further inventive aspect of the method and system according to the invention, a decoding message is sent indicating also that reciprocal discovery has occurred, that is, a biunivocal detection, between two devices registered with the service, thus the identification of proximity is associated with a higher level of certainty that can act according to a first access mode, that envisions transactions more subject to risk of attacks or to which a high degree of certification of proximity between the involved devices is necessary. Moreover, the first device can receive a message indicating a univocal detection by the first registered device only of a second device, also registered, and therefore that the identification of proximity is associated with a lower level of certainty that can act according to a second access mode, which envisions less risky transactions or for which a high degree of certification of proximity between the devices involved is not necessary. The unique detection can also be indicative of the detection of a second device registered but lacking the ability to send its own detections to the server and therefore requiring interactions of the corresponding type (for example those that do not envision a channel between server and the second device). When the first device or, more commonly, the second detected device does not appear to be registered, the first device receives a message according to which it is considered, for the purposes of the certified proximity detection service implemented on the server, not to be in the proximity of the second detected device.

Thus, FIG. 1 represents a telecommunication system that implements the method according to the invention, in which a user 11 is equipped with a first communication device 21 and a second user 12 is equipped with a second device 22. The first device 21 and the second device 22 are provided with transceiver means to make a wireless communication channel 30, suitable to support a protocol with which discovery operations can be performed and the devices may become visible, or discoverable. In other words, on such wireless communication channel 30, the first device 21 is capable of detecting devices equipped with analogous wireless communication channels 30 that are located in the proximity, i.e., in the functional range of the transceiver means that realise the wireless communication channel 30 and of publishing the attributes of the device. By way of non limiting example, such a local communication channel 30 can be a communication channel operating according to the Bluetooth protocol and each device 21 or 22 thus comprises a corresponding peripheral, that is, a transceiver, operating according to the Bluetooth protocol. Each of the devices 21 or 22 in the embodiment described further comprises a peripheral or transceiver capable of establishing a respective second communication channel 41 or 42 for exchanging data with a remote computer 50. As detailed below, in general, for the implementation of the method according to the invention even just the first device 21 can be equipped with a peripheral to establish the second communication channel 41.

The communication devices 21 and 22 in the embodiment are, in general computers with computing power and memory equipped with transceiver means to establish a channel for direct connection, preferably to establish a Bluetooth connections. Preferably, it can be mobile devices such as mobile phones, smart phones, computer tablets or portable computers. Such devices are entities of the 'untrusted' type, even if the method can also be applied to entities of the 'trusted' type.

In the example, the second communication channels 41 or 42 are of the same type, the exemplary devices 21 and 22 being two mobile telephone terminals operating for example via a UMTS connection. In general, the second channels 41 and 42 may also be different from each other, provided that they realize any type of connection that allows the respective communication device to reach the remote computer server 50. For example, it can be a 2G, or 3G, or 4G or ADSL connection. Thus, in general, the remote computer server 50 can be accessed through a telecommunications network such as Internet Protocol, as well as through the HTTP protocol, but also through other types of networks suitable to establish a data exchange connection between servers and client devices.

The remote computer server 50 is suitable to access a database 60, which can be displaced in such a computer 50, but in general resides on another computer that the server 50 can access, to perform the information recovery operations and writing and editing of data in the database 60, in particular in the context of a service 80, in particular a Web service, for which the remote processor 50 operates as a provider to the device 21 which operates as a client. Such service 80 will be described in detail below when describing the method according to the invention in detail, but essentially provides, through consulting the data base 60, the decoding of attributes of discovered devices in close proximity so as to verify in a certified way the proximity between the client device and any devices detected in the vicinity.

The computer server 50 generally includes one or more processors with computing power and memory and is configured to operate as a 'trusted' entity. To the person skilled in the art it is clear that the database 60 is exemplary of a data structure comprising a set of archives connected according to a particular logical model (relational, hierarchical, network or objects) and in such a way as to allow the management of the data themselves (search or query, insert, delete and update) by special software applications. To the person skilled in the art it is also clear that such database accessible by the server 50 is not necessarily included in the computer that operates as a server and/or implements the portion 80b of service that implements the method on the server 50 and accesses the database 60 itself.

The method according to the invention comprises four main phases:
  the activation phase of the service 80;
  authentication phase of the client device 21 on the service 80;
  registration phase of the client device 21 in the service 80;
  phase of decoding the attributes of detected devices 22.

As mentioned, the main object of the method is the decoding phase, which returns to the client device the identifier of any detected devices and the mode of proximity detection (non-unambiguous or biunivocal or not proximal) detected by the server. The activation, authentication and registration phases are further phases that complete the method and the results of which contribute to the formation of the decoding message.

In the following we will assume in general that the credentials C of the user 11 and of the device 21 are the same, although it is possible, particularly with client devices such as smart phones or portable computers, that multiple user profiles be defined and thus the client device 21 can send different credentials depending on the user who employs it.

The above-mentioned phases of the method according to the invention are implemented, as mentioned, preferably via a service, or software system designed to support interoperability between different computers on the same network, which is apt to provide a software interface, through which other systems can interact with the service enabling the operations described in the interface by means of appropriate "messages". Preferably, the service is a Web Service that for example exchanges messages in a format such as JSON (Java Script Object Notation) with the HTTP protocol. Alternatively, by way of example, XML messages can be used.

The service as a system software includes a portion that is performed by the server side, indicated by an application 80a operating on the computer server 50, and a portion which is executed on the client side, i.e., from the side of the client device 21, indicated by an application 80b installed and operating in the example in such client device 21. The detected device 22 can possibly be equipped with such application 80b client-side, although this is not necessary for performing the method in its most general form.

The term service generally refers to the service as above defined, but typically application software will be installed on the client device 21 and on the server 50 an API (Application Programming Interface) will be installed.

Thus the computer server 50 is configured as a 'service provider' which provides the service to the client device operating as a 'service requester'. The portion of the service 80a installed on the server 50 manages the data base 60, as mentioned and illustrated in more detail below.

The service 80 can be defined as a certification of proximity detection service determined by the execution of a discovery operation by the client device 21. The certification comes from the fact that to obtain a proximity detection it is necessary that at least the device 21 is registered with the service, i.e., is present in a list of devices that are registered on the server 50.

The method according to the invention envisions that for each client 21 or detected device 22 registered in the service 80, the list of its attributes AM or AS and the system identifier IDM or IDS that specifically identifies it in the data base, as well as in all of the detections, univocal or biunivocal, which will be described below, relating to that device are stored in such database 60. As detailed below, the non-registered devices determine a non proximity mode.

Univocal detection indicates that only the detection of a second device by a first device is recorded in the database. Biunivocal detection means that the detection of a second device by a first device and also the detection of the first device by the second device within a given time interval are recorded in the database.

FIG. 2 is a flow diagram illustrating a request for activation of the method according to the invention.

The first device 21, as mentioned, is defined as the client device, because it operates in such capacity with respect to the computer server 50 as defined by the service 80. The device 22, which in general does not necessarily implement the software module 80b, in that it has been detected by the client device 21 in a discovery operation on the first channel 30, is defined herein as the discovered device.

Then, in a step 210, the user 11, via his client device 21, requests activation of the service 80 from the client side, operating on the client-side application 80b.

Thus, in a step 220, the client-side service 80b verifies the authentication of the user 11.

Figure 5:
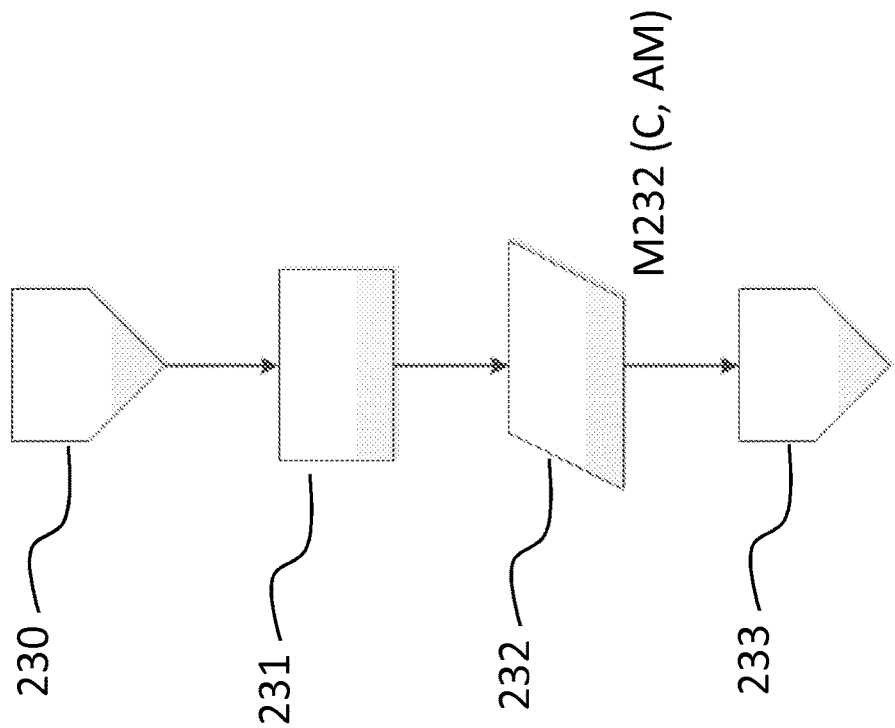
FIG. 5 is a client-side authentication request of the method according to the invention.

In a step 230, if the user 11 is not authenticated, there is a transfer to an authentication request phase on the client side, in which credentials C are entered into the client device 21, as shown in FIG. 5.

In a step 240, if the user 11, or the client device 21, is already authenticated, the client-side service 80b is started on the client device 21.

In a step 250 there is a transition to the phase of activation of publication on the client side.

In a step 260 in parallel there is a transition to the phase of activation of the detection of published attributes 260 on the client device 21 by the service client side 80b.

FIG. 3 is a flow diagram for such step 250 relative to the phase of activation of publication by the client device 21 in which the service 80b (client side) activates and sets the wireless communication peripheral 30 to public visibility (discoverable), in the example embodiment described herein implementing the Bluetooth protocol, of the client device 21.

In a step 251 the local communications Bluetooth peripheral 30 transmits the attributes AM of the client device 21, according to Bluetooth protocol standards. Such attributes AM of the client device 21 comprise one or more among:

attributes of the peripheral, (for example, device name, device address, . . . )
attributes of the service (service name, UUID, . . . );
attributes of the session (session ID, . . . )
peer attributes (peer ID, peer name, . . . )
any attribute transmissible via channel 30, in the example Bluetooth, to another peripheral that operates on channel 30, in the example Bluetooth, of another device non Paired or Connected (with respect to the client device 21).

It is possible to find the corresponding attributes listed above even if the wireless communication channel 30 is of the Wi-Fi type. For example in place of the device name identifier the SSID (Service Set Identifier) is used and in place of the device address identifier the BSSID (Basic Service Set IDentifier) is used.

Figure 4:
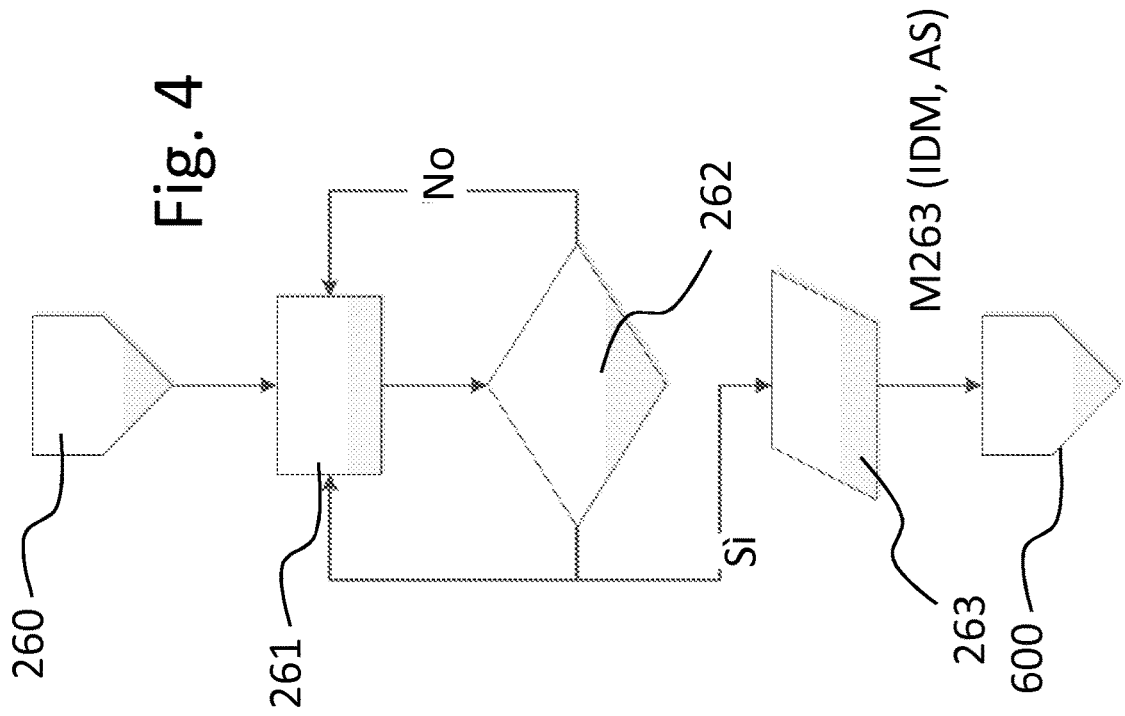
FIG. 4 represents the activation of the detection of published attributes of a device operating the method according to the invention.

FIG. 4 is a diagram showing the activation of the detection attributes published 260 on the client device 21 by the client side service 80*b*.

Then, in a step 261 the service side 80*b* client initiates a search for one or more devices 22 with peripherals with public visibility in the vicinity, i.e., within the working range of the wireless communication channel 30. In particular, according to a preferred embodiment by means of standard Bluetooth services (Device Discovery) the client side service 80*b* initiates a search for all devices in proximity with active Bluetooth peripherals set with public visibility (discoverable), and for each device detected, in the example there is only device 22, receives the list of possible attributes AS associated with the device detected, which may include one or more of the following:
attributes of the peripheral (device name, device address, . . . );
attributes of the service (service name, UUID, . . . )
session attributes (session ID, . . . )
peer attributes (peer ID, peer name, . . . )
any attribute transmissible via the channel 30, in the example Bluetooth to another peripheral that operates on channel 30, in the example Bluetooth, of another device non Paired or Connected (with respect to the client device 21).

Also in this case, it is possible to find the corresponding attributes listed above even if the wireless communication channel 30 is of the Wi-Fi type.

In a step 261 such search operation is repeated cyclically until the client side service 80*b* is interrupted by the user 11 of the client device 21.

Then, in a step 262 the client-side service 80*b* verifies whether the search in step 261 has discovered devices 22.

In a step 263, for each result returned by the search in step 261, the client-side service sends a decoding request message M263 to the computer server 50 containing at least the following information:
system identifier IDM, received in the authentication phase in step 238 or in the registration phase in step 550, described better hereinafter;
attribute list AS detected relating to one or more devices detected, in this case the device 22 detected in step 262.

System identifier means a code system (not chosen by the user) that is assigned to the user or device by the service 80*a* on the server side during the registration phase. All communication from and to the server 50 is done with this identifier.

The decoding request message M263 may contain other possible data supplied, such as the GPS position of the client device 21.

Then in a step 600 a transition is made to a server-side decoding phase.

FIG. 5 illustrates the client-side authentication request 230, under which the client-side service 80*b* initially manages the authentication request from the client device 21 (or from the user 11).

In a step 231, the client-side service 80*b* identifies one or more attributes AM relative to the client device 21 listed in detail above with reference at step 251, via input from the user 11 or automatically drawing it from appropriate areas of memory in the device 21.

In a step 232, the client-side service 80*b* sends a message M232 to the computer server 50, containing at least the following information:
the credentials C of the user 11 or of the client device 21;
the attributes AM identified in step 231.

In a step 233 a transition is made to the server-side authentication phase.

FIG. 6 is a flow diagram relating to such phase of authentication from the server side, in which the server-side service 80*a* manages the authentication process.

Then in a step 234, such server-side service 80*a* receives the message M232 sent from the client device in step 232, containing the credentials C and attributes AM.

In a step 235 the server-side service 80*a* verifies whether the user 11 or client device 21 indicated by the message M232 received in step 234 is registered on the server side by the service 80, that is, whether credentials C and attributes AM have a corresponding registration in the database 60.

If not, in a step 236 the server-side service 80*a* sends a message M236 to the client device 11 indicating that the user for which authentication is requested is not registered in the service 80.

In the positive case, in a step 237, the server-side service 80*a* verifies if the credentials C of the user 11 or client device 21 indicated in the message M232 received in step 234 are correct, with respect to those registered in the database 60 for use with the service 80.

If so, in a step 238 the server-side service 80*a* sends a message M238 to the client device 21 indicating that the credentials C supplied are correct and indicating the system identifier IDM, assigned to the user 11 or client device 21 upon registration, as indicated below.

If not, in a step 239 the server-side service 80*a* sends a message M239 to the client device 21 indicating that the credentials C provided are not correct.

Then, in a step 300 there is a transition to the client-side authentication phase.

FIG. 7 is a flow diagram relating to such server-side authentication phase, in which the server-side service 80*a* manages the authentication process.

Then in a step 310, the client-side service 80*b* receives the message sent by the computer server 50 in step 236, 238 or 239, i.e., message M236 indicating that the user for which authentication is requested is not registered in the service implemented in the database 60, or message M238 indicating that the credentials C are correct and the system identifier IDM assigned to the user 11, or message M239 indicating that the credentials C provided are not correct.

In a step 320 the client-side service 80*b* examines whether the message received is the message M236 of step 236.

If not, in a step 400 the client-side service 80*b* performs a registration from the client side, i.e., in storage media available in the client device 21, storing that the authentication procedure was not successful and the user 11 or client device 21 is not registered. The client-side service 80*b* passes to the registration request phase on the client side 400, proposing a registration request to the user 11 via the client device 21. Such request for registration may also be optional.

Thus, in a step 330 in the case of a positive result in step 320, the client-side service 80b examines whether the message received is the message M238 of step 238 or message M239 of step 239.

In a step 340 the client-side service 80b records the success of the authentication process, the user authentication and the system identifier IDM assigned by the service server side 80b in service 80 from the client-side on the client device 21.

In a step 350 the client-side service 80b registers from the client side on the client device 21 that the authentication procedure was not successful and the user is not authenticated.

Figure 8:
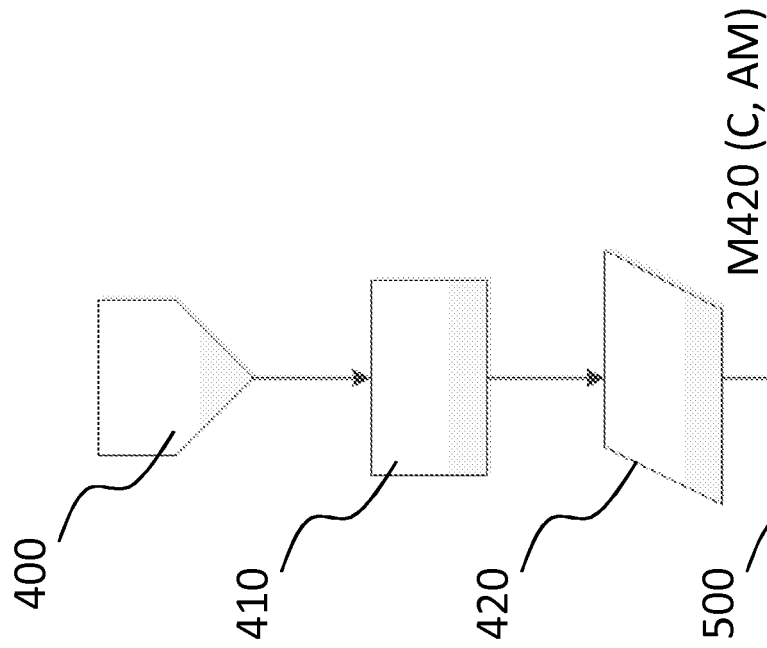
FIG. 8 is a flow diagram relating to a client-side registration request of the method according to the invention.

FIG. 8 shows the registration requesting phase on the client side 400, in which the client side service 80b manages the registration request.

In a step 410 the client-side service 80b manually or automatically identifies one or more attributes AM relative to the client device 21.

In a step 420, the client-side service 80b sends a message M420 to the computer server 50, containing at least the following information:
the credentials C of the user
attributes AM relating to the client device 21 identified in step 410.

Then there is a transition to a server-side registration phase 500.

Figure 9:
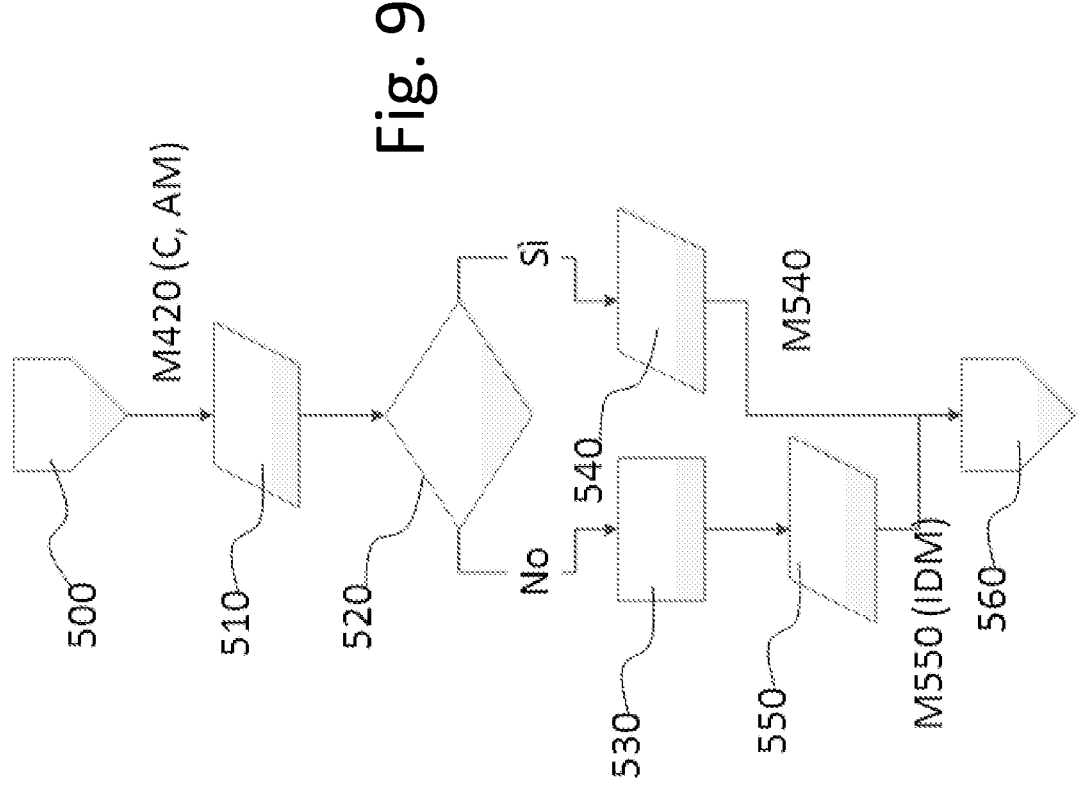
FIG. 9 is a flow diagram relating to a server-side registration phase of the method according to the invention.

By way of example, in the client-side registration requesting phase 400, given two generic users A and B there can be:
User A registers with the following attributes:
Device name: MyName_A
Device address: F0:DC:B2:BA:E8:5 D
User B registers with the following identifiers:
Device name: MyName_B
Peer ID: MyPeer_B FIG. 9 shows the server-side registration step 500, where the server-side service 80a manages the process of registration to the service.

In a step 510 the server-side service 80a receives the message M420 containing credentials C and attributes AM sent by the client device 21 in step 420.

In a step 520 the server-side service 80a checks whether the user indicated in the message of step 510 is registered in the service.

If so, in a step 540 the server-side service 80a sends a message M540 to the client device 21 indicating that the user whose registration is requested is already registered in the service.

If not, in a step 530 the server-side service 80a registers the user by means of the system identifier IDM that is associated in the database 60 to all attributes AM indicated within the message of step 510 M420.

In a step 550 the server-side service 80a sends a message to the client device 21 indicating that the user whose registration is requested has been registered with the service in the database 60 and indicating the system identifier IDM assigned to the user in step 530.

In a step 560 there is a transition to the client-side registration, shown in more detail in FIG. 10, in which the client-side service 80b manages the registration process.

In a step 570 the client-side service 80b receives the message M550 or M540 sent by the server 50 in step 550 or 540.

In a step 575 the client-side service 80b examines whether the message is of the type issued in step 540 or 550.

If positive (the message received is of the type M550), in a step 580, the client-side service 80b registers from the client side, onto the client device 21, that the registration process was successful, that the user is registered and the system identifier IDM of the user.

If negative (the message received is of the type M540), in a step 590 the client-side service 80b registers from the client side, onto the client device 21, that the registration procedure was not successful and the user is not registered.

Figure 11:
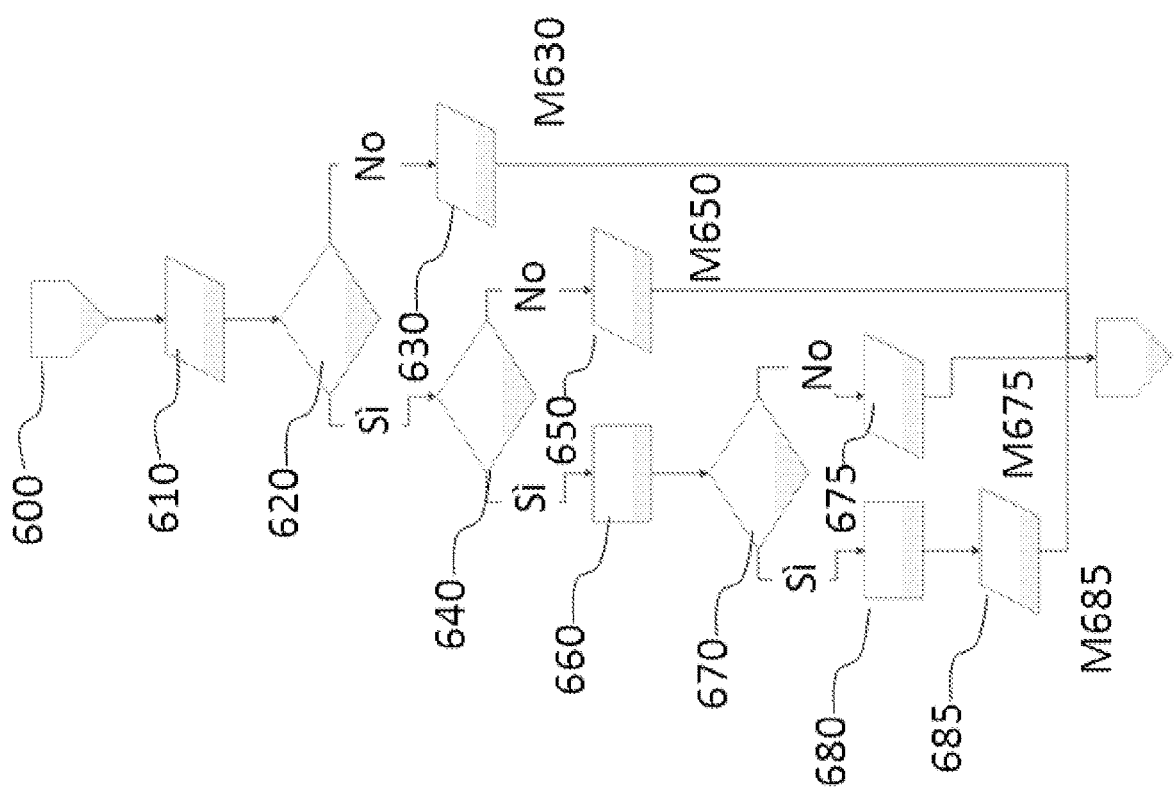
FIG. 11 is a flow diagram relating to a server-side decoding phase of the method according to the invention.

FIG. 11 shows the server-side decoding phase 600 in which the server-side service 80a manages the decoding process.

In a step 610 the server-side service 80a receives the decoding request message M263 sent by client device 21 in step 263.

In a step 620 the server-side service 80a verifies whether the client device indicated in the message M263 by the system identifier IDM is registered with the service 80 in the database 60.

Querying such database 60 using the attributes AM and the identifier IDM of the client device 21 and the attributes AS of the discovered devices 22 as search keys can obtain information concerning the registration of a device in the service, as described above. Also, requests for decoding on the part of registered and authenticated client devices in the service 80 carried out by means of message M263 are stored or counted in the database 60, in particular together with timestamp information, better described below.

Thus, in case of negative results in step 620, in a step 630 the server-side service 80a sends a message M630 to the client device 21 indicating that the client device 21 is not registered in the service 80.

In case of a positive result at step 620, in a step 640 the server-side service 80a verifies whether the attributes AS of the discovered devices 22 indicated in the message M263 in step 610 correspond to users or devices registered with the service in the database 60.

If not, in a step 650, the server-side service 80a sends a message M650 to the client device 21 indicating that the attributes AS of the detected devices 22 indicated in the message M263 in step 610 does not correspond to a user registered with the service 80.

If so, in a step 660 the server-side service 80a records that the client device 21 has univocally detected one or more devices 22 and records the information relative to such detection:
the server 50 date
server 50 time
any other information supplied in message M263 of step 610.

Therefore, information relating to the detection is recorded in the database 60, i.e., for example which is the relevant client device and which the device detected via their system identifiers, in such decoding request M263, and time information on reception at servers, in particular the server time and date.

By way of example, a record in the list of registered users may be structured as follows:
user_id: 001
username: MyUsername
password: MyPassword
name: MyName
facebook_id: 547969090
device_name: MyDevice
device_address: F0:DC:B2:BA:E8:5 D peer_ID: MyPeer_ID
peer_name: MyPeerName
UUID: MyUUID User_id corresponds to the system identifier IDM or IDS. Name stands for the name of the user. Below is an example of accessory information: the name may be supplied for example only to users/devices with which a passive or active mode is established, as shown below.

Facebook_id is a Facebook identifier of the user. This identifier is an example of an accessory service: the link to the Facebook page of the user may be supplied for example only to users/devices with which an active or passive mode is established.

Device_name, device_address represent actual attributes of the device peer_ID, peer_name represent attributes of the peer, while UUID is an attribute of the service.

There may be additional attributes depending on the user.

By way of example, a record in the table of registered users may be structured as follows:

master_user_id: 001
slave_user_id: 002
last_contact: 18-04-2011 12:28:43
last_checkin: 18-04-2011 12:28:43
posizione_GPS: (Not mandatory)

Master_user_id corresponds to the system identifier IDM of the client device 21, slave_user_id corresponds to the system identifier IDS of the detected device 22, last_contact indicates the date and time (server) of the last univocal detection, while last_checkin indicates the date and time (server) of the last biunivocal detection. In the case where a biunivocal detection did not occur, the last_checkin field would be blank.

In the case shown here, the value of the last_checkin field indicates that there has been a biunivocal detection, therefore there will certainly be another system record of this type (master_user_id and slave_user_id reversed):

master_user_id: 002
slave_user_id: 001
last_contact: 18-04-2011 12:28:15
last_checkin: 18-04-2011 12:28:43
posizione_GPS: (not mandatory)

In a step 670 the server-side service 80*a* verifies whether a detection correlating the client device 21 and the detected device 22 already exists in the database 60, but with the roles reversed, i.e., the detected device 22 has been surveyed previously in the database 60 with the role of the client device and the client device 21 has been surveyed with the role of detected device. In addition, the server-side service 80*a* verifies whether the two different measurements were made over a period of time (e.g., within an interval of one minute).

In a step 675 the server-side service 80*a* sends a message M675 to the client device 21 indicating a system identifier IDS of the detected device 22 recovered from the database 60 based on attributes AS the data of the univocal detection recorded in step 660.

In a step 680, if the condition indicated in step 670 has occurred, the server-side service 80*a* registers in the database 60 that the client device 21 has biunivocally detected the detected device 22 and the information relating to such biunivocal detection, i.e., as before:
the server 50 date
server 50 time
any other information supplied in message M263 of step 610.

In a step 685 the server-side service 80*a* sends a message M685 to the client device 21, indicating the system identifier IDS of the device detected 22 and the data of the biunivocal detection recorded in step 680.

In a step 690 there is a transition to the client-side decoding phase, which is shown in detail in FIG. 12. In such phase, the client-side service 80*b* manages the decoding process and comprises a step 700 in which the client-side service 80*b* receives the message sent by the server 50 in step 630, 650, 675 or 685, i.e., the message M630 indicating that the client device is not registered with the service 80, or message M650 indicating that the attributes specified in the decoding request message M263 do not correspond to a user registered with the service 80, or message M675 indicating the identifier of the detected device 22 and data of the univocal detection recorded in step 660, or message M685 indicating the identifier IDS of the detected device 22 and the data of the biunivocal detection recorded in step 680.

Specifically, in a first step 710, the client-side service 80*b* examines whether the message is the M685 message, indicating a biunivocal detection.

If so, the client-side service 80*b* determines that there is a certified proximity between the client device 21 and the detected device 22 and passes to a step 800 relating to an active mode, i.e., it records on the client device 21 the system identifier IDS of the detected device indicated in the message M685 of step 685, the positive result of the decoding procedure and the availability of such active mode 800 with respect to the detected device 22.

Conversely, if the message is not of the type shown in step 685, in a step 720 the client-side service 80*b* examines whether the message is the message M675 indicating a univocal detection.

If so, the client-side service 80*b* determines a lower proximity level for the certified proximity between the client device 21 and the detected device 22 and passes to a step corresponding to a passive mode 900, in which it registers from the client-side on the client device 21 the system identifier IDS of the device detected 22 indicated in the message M675, the positive result of the decoding procedure and the availability of passive mode 900 with respect to the detected device 22.

If not, i.e., messages M630 or M650 have been received, the client-side service 80*b* determines a proximity level between the client device 21 and the detected device 22 and passes to a step corresponding to an inactive mode 1000, in which the client-side service 80*b* registers on the client device 21 that the decoding procedure was not successful and the inactive mode 1000 is available to the detected device 22, that is, no interactions can occur between the devices through the service 80.

Thus, by adopting the illustrated protocol, at the end of the operations performed by the service, in its server-side 80*a* and client-side 80*b* parts, the method envisions that between users 11 and 12 or client 21 and detected 22 devices, the following three modes of access to services or information related to the detected device 22 can be signalled in the client device 21:

active mode 800: the service 80*b* indicates that the client device 21 and the detected device 22 are in a proximity relationship defined as certified by the service 80. The client device recognises the system identifier IDS of the detected device 22. In such active mode 800 for example, the client device 21 can thus access the information or services related to such device 22 through a communication channel 41 that operates towards the server 50, according to a preferred embodiment through a channel that connects to the server via the Web. In turn, the detected device 22 recognises the system identifier IDM of the client device 21 and can thus access through its own channel 42 that connects it to the server 50, in particular via the Web In particular, to access information, for example the detected device is an information kiosk that delivers information of public interest, the communication channel 41 is sufficient to access the information that will be available through the server 50. In the case in which an accessory service is used, that must deliver the information (for example, a chat) to the device 22, then in that case the channel 42 is also necessary.

passive mode 900: the service 80b indicates that the client device 21 and detected device 22 are in a close relationship defined by the service 80, although they may not actually be in proximity. The client device 21 recognises the system identifier IDS of the detected device and may thus interact with it, for example, through access to further information and services connected to it, using the second channel 41 towards the server 50;

inactive mode 1000: the service, specifically the service from the client side 80b, indicates that the client device 21 and the detected device 22 are not in proximity.

In terms of security, in the passive mode 900 devices 21 and 22 could be in proximity, but it cannot be excluded, for example, that the device 22 is surreptitiously publishing the attributes of a device registered in the data base 60 that have been stolen in some way. However, this can be excluded if the detected device 22 has also sent a decoding request to the server 50, for which it is necessary to have a system identifier, which is only obtained with registration or authentication with the service 80. Unlike other services (such as Location-based Services), that certify the proximity between two entities based on a simple univocal detection (only one entity is claiming to be in proximity to the other), the method according to invention only certifies the proximity between two entities with a biunivocal detection. This approach allows possible false declarations of proximity by a single entity with respect to another to be discarded, or at least to not certify the proximity.

Univocal detection is considered "potential proximity" and therefore not certified.

Therefore, each of the three modes 800, 900, 1000 described above is associated with a different level of certification of the proximity between two devices and can therefore be associated with different services.

In conclusion, the method according to the invention offers as a result information composed of the system identifier of the detected device and the certification level of its proximity, which is made to correspond to a mode of access to information and services of the detected device 22 corresponding to one of three modes 800, 900, 1000. An application can then be structured in a flexible manner on the basis of these elements in such information.

The passive mode 900 can be used in contexts where it is not necessary to have proximity certified by both interacting devices.

For example in the case of electronic public transport poles, a wireless device (Bluetooth/Wi-Fi) whose attributes are stored in database 60 and accessed by the trusted server 50 can be incorporated into each pole. Such registration is equivalent to the service registration phase. Once the device is activated, the wireless peripheral, for example Bluetooth, publishes its attributes on the wireless channel, according to the standard of the wireless protocol used, i.e., in the example Bluetooth. A user registered with the service that is in proximity to that electronic pole can receive from the server 50, where all the vehicle arrival and departure times, traffic information, current news, advertising and offers were previously stored in association with that device/pole. This solution does not require a computer, mass storage or the application 80b for the device incorporated into the pole.

According to a further example, with a Bluetooth-like device, that is, only able to publish its attributes on the wireless channel, information kiosks can be made, as previously mentioned, for example, at monuments or museums. A user registered to the service receives cultural, tourist, local news and other information from the server 50.

The active mode 800 can be used, for example in contexts where indicating the certified proximity by both devices is necessary. For example:

customer retention/loyalty card: businesses may have devices with wireless peripherals and service 80b registered on the server 80 and offer coupons and discounts to all registered users who visit the business or make purchases;

virtual business card: two users registered and in proximity can exchange virtual business cards;

file sharing: two users registered and in proximity can exchange files;

instant messaging: two users registered and in proximity can exchange messages;

mobile payment: two users registered and in proximity can exchange money. In this case it is necessary to associate a virtual wallet mechanism to the profile. The service can manage an internal virtual currency, or simply undertake transactions on other platforms. For example, a User A with virtual wallet number, for example PayPal, PayPal X (account number registered in database 60), User B with PayPal account number Y (account number registered in the database 60). The system asks PayPal to undertake a transaction from PayPal account X to PayPal account Y;

games: two users registered and in proximity can create multiplayer sessions with the same videogame.

Naturally, the inactive mode 800 is not associated with specific services; in that it simply indicates that at least one of the two devices involved is not registered with the principal service of the protocol.

Thus, the proposed solution advantageously permits by means of a trusted central server and of a service to which untrusted devices equipped with wireless channels 30 can register, to obtain an indication of the certified proximity between devices according to the modality of said service and to initiate an interaction including corresponding modes of accessing information and services of the untrusted devices in proximity without establishing a complete direct connection on the wireless channel between the devices involved and thus avoiding the risk of informatics attacks.

The method and system according to the invention are also particularly suitable for connections to services and applications that require obtaining the most valid information possible on the effective location in proximity of the device that discovers a given detected device.

With respect to for example services of the known LBS (Location-Based services) type, which use GPS information to establish the position of a user or device, the method according to the invention offers the following advantages:

proximity is certified: because in the case of active mode the detection is biunivocal, while with LBS services the server can not verify that the data supplied by the client are real and thus certify the client position;

the positioning is less precise, in that especially indoors GPS signal reception is weak and the position detected can be imprecise. By means of the method and system according to the invention on the other hand precision is always high (in the order of several meters) also indoors;

less energy consumption, because the wireless peripherals, such as for example those that use the Bluetooth 4.0 protocol, consume less energy than GPS.

application flexibility, deriving from the high level of proximity certification and from the automatic identification of users make realisation of a wide array of practical applications possible.

Naturally, without prejudice to the principle of the invention, the details of construction and the embodiments may vary widely with respect to those described and illustrated purely by way of example, without departing from the scope of the present invention.

The recording of requests for decoding received, used to verify biunivocal detection, is preferably carried out in the database, but can also be carried out by other logical structures, storage, or processing accessible by the application or server-side service.

Finally, it should be noted that the main object of the method according to the invention is to provide a signalling to client device 21 of a mode for accessing information and services from the detected device 22 based on the system identifiers IDS of such detected device 22 and on the level of proximity obtainable from messages M685 and M675, as wells as from the messages M630 and M650 that indicate substantially a condition of error or non usability of the service 80.

Such signalling can be managed transparently from the service client 80b, which indicates the availability of any accessory services associated to the modality signalled. The signalling can also envision a signalling through visualisation on client device 21 or initialisation of a variable or flag on such client device 21 or an analogous means of making available the modality information signalled derived from the client device 21 based on the content of the decoding message.

Such signalling of a mode of access to the information and services of the detected device 22 allows the application to recognize the level of proximity relationship defined as certified by the service provided by the server and consequently to choose access options that may be secure or trusted. However, the method itself does not necessarily limit the access options and the application may also, based on the signalling of the available access modes, operate the access in a different way, for example, deciding to use channel 42 between the server 50 and the detected device 22 even in the presence of the signalling of passive mode 900.

The invention claimed is:

1. A method for performing a trusted interaction between a first communication device configured to establish a first wireless type communication channel and one or more second devices configured to operate on said first wireless type communication channel, said first wireless type communication channel being of the type suitable to allow the implementation of discovery operations to search for devices among said one or more second devices that become visible, or discoverable, on said first wireless type communication channel within a radius of operation of said first wireless type communication channel, said method providing that said first communication device publishes its device attributes on said first wireless type communication channel to become visible, and detects through said first wireless type communication channel attributes published by said one or more second devices to become visible or discoverable, said first communication device accessing a database that comprises stored attributes of devices to become visible, wherein said first communication device is configured to establish a second communication channel to communicate in a client-server communication relationship with a remotely located computer server to which said database is associated, said first communication device, after a discovery operation to detect said one or more second devices, sends through said second communication channel to said remotely located computer server a corresponding decoding request comprising at least one system identifier, assigned in the database to said first communication device, and said attributes of the one or more second devices detected on said first wireless type communication channel, said remotely located computer server performs with respect to said decoding request a decoding operation that comprises at least one step of obtaining from said database, a respective system identifier of said one or more second detected devices, said remotely located computer server sends through said second communications channel to said first communication device a decoding message comprising a result of said decoding operation that comprises said system identifier, at the first communication device based on the results indicated in said decoding message received from the remotely located computer server the system identifier received from said remotely located computer server is recorded and the availability of a determined mode of access to information or services of the one or more second devices detected;

wherein said decoding operation further comprises verifying if, within a determined interval of time, a second decoding request initiated by the detection of the first communication device by the second detected device has also arrived at the remotely located computer server.

2. The method according to claim 1, wherein said decoding operation comprises recording said request for decoding on the remotely located computer server.

3. The method according to claim 2, wherein said operation of recording said decoding request on the remotely located computer server comprises recording information relative to such decoding request in the database, in particular the corresponding system identifiers, and time information of reception at the remotely located computer server, in particular the date and time of the remotely located computer server.

4. The method according to claim 2, wherein when said decoding message indicates that the second decoding request initiated from detection of the first communication device by the second detected device has arrived at the remotely located computer server the first communication device signals a first mode of access to information or services of said one or more second devices detected.

5. The method according to claim 2, wherein when said decoding message indicates that the second decoding request initiated from detection of the first communication device by the second detected device has not arrived at the remotely located computer server the first communication device signals a second mode of access to information or services of said one or more second devices detected.

6. The method according to claim 5, wherein when said second mode of access is signalled, said first communication device is enabled to operate by means of said system identifier, an access through a connection comprising the second communication channel for access to further information and/or services of said detected device.

7. The method according to claim 2, wherein said decoding operation initially comprises before said recording operation at the remotely located computer server of said decoding request to verify if the first communication device or the one or more second detected devices are registered in the database and, if not, to send a corresponding decoding message susceptible of signalling to the first communication device a third mode of access.

8. The method according to claim 7, wherein when said third mode of access is signalled the one or more detected devices are not considered detected in proximity.

9. The method according to claim 2, wherein when said first mode of access is signalled, the first communication device is enabled to operate by means of said system identifier access by means of the second communication channel.

10. The method according to claim 9 wherein said first communication device is also enabled to operate by means of said system identifier access to said detected device via the second communication channel, the remotely located computer server and a communication channel between said remotely located computer server and said detected device.

11. The method according to claim 1, wherein said first communication device interoperates with said database by means of software modules respectively resident on said remotely located computer server and on at least said first device, said software modules being adapted to put at least said first communication device and said remotely located computer server in a client-server communication relationship.

12. The method according to claim 11, wherein said software modules respectively resident on said remotely located computer server and on at least said first communication device, act to put at least said first communication device and said remotely located computer server in a client-server communication, defining a service, in particular a Web service, to interoperate said first device and said remotely located computer server.

13. The method according to claim 12, wherein said service, in particular Web service, includes a software application which software module installed on the first communication device and an API (Application Programming Interface) installed on the remotely located computer server.

14. The method according to claim 1 wherein said system identifier of the first communication device or of the one or more detected device is a specific code of the database, allocated by said software modules and assigned in a registration phase of the first communication device or of the one or more detected device.

15. The method according to claim 1 wherein said first wireless type communication channel operates according to a Bluetooth protocol.

16. The method according to claim 1 wherein said first wireless type communication channel operates according to a Wi-Fi (Wireless Fidelity) protocol.

17. The method according to claim 1 implemented in a telecommunications system to operate said trusted interaction between the first communication device configured to establish said first wireless type communication channel and said one or more second devices configured to operate on said first wireless type communication channel, said first wireless type communication channel being of the type suitable to allow execution of said discovery operations to search for devices among said one or more second devices that are visible, or discoverable, on said first wireless type communication channel within said radius of operation of said first wireless type communication channel, said telecommunications system comprising said remotely located computer server and said first communication device being further configured to establish said second communication channel with said remotely located computer server.

18. The method according to claim 17 wherein a communication device, configured to operate in said communication system, establishes the first wireless type communications channel of a type suitable to allow execution of discovery operations to search for said devices that are visible, or discoverable, on said first wireless type communication channel within said radius of operation of said first wireless type communication channel.

19. The method according to claim 17 wherein said computer server associated with said database is configured to operate in the telecommunication system according to claim 17.

* * * * *